Figure 1:
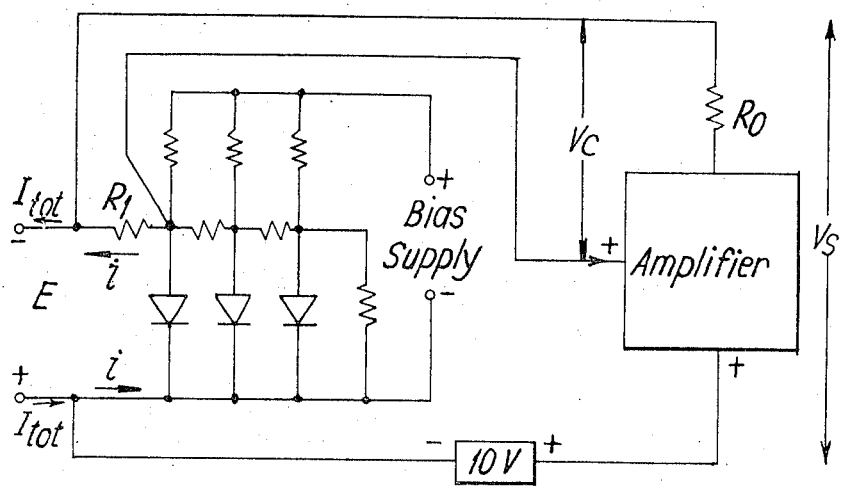

United States Patent

[11] 3,551,694

| [72] | Inventor | Edward R. Boxall<br>Stevenage, England |
|---|---|---|
| [21] | Appl. No. | 685,188 |
| [22] | Filed | Nov. 22, 1967 |
| [45] | Patented | Dec. 29, 1970 |
| [73] | Assignee | British Aircraft Corporation, Limited<br>London, England<br>a British company. |

[54] FLUID FLOW SIMULATION APPARATUS
4 Claims, 2 Drawing Figs.

[52] U.S. Cl. ................................................ 307/229,
235/197; 328/142
[51] Int. Cl. ...................................................... G06g 7/12
[50] Field of Search............................................ 307/229,
317; 328/142, 143, 145; 235/197, 150.53

[56] References Cited
UNITED STATES PATENTS

| 2,581,124 | 1/1952 | Moe ............................... | 307/229X |
| 3,005,148 | 10/1961 | Salomonsson................. | 328/142UX |
| 3,131,298 | 4/1964 | Creusere ....................... | 307/229X |
| 3,188,493 | 6/1965 | Malagari ....................... | 307/229 |
| 3,371,224 | 2/1968 | Polo .............................. | 307/229 |
| 3,404,266 | 10/1968 | Woodley ....................... | 235/197 |
| 3,440,443 | 4/1969 | Popodi .......................... | 307/229X |

*Primary Examiner*—Stanley T. Krawczewicz
*Attorney*—Sughrue, Rothwell, Mion, Zinn & Macpeak ABSTRACT: A circuit for simulating fluid flow in a pipe in a direct analog water network analyzer includes a pair of input terminals, a curve forming network connected to the input terminals and having a network of resistances and bias rectifiers to provide a progressively changing number of resistor-rectifier paths in response to a progressively changing input voltage. The network includes a first resistance which is always effective. The circuit also has an amplifier with a load resistor, the amplifier having high output impedance and a current characteristic such that current through the load resistor is dependent upon the input voltage to the amplifier and substantially independent of the supply voltage to the amplifier. The amplifier supply voltage terminals are connected to the circuit input terminals and the amplifier input terminals are connected to the supply circuit input terminals through a part of the first resistance of the function generating circuit.

PATENTED DEC 29 1970

3,551,694

FLUID FLOW SIMULATION APPARATUS

The invention relates to an improvement in circuits designed to provide an electrical analogue of fluid distribution networks where the law of distribution takes the form $H = rf(Q)$, H being the head loss, Q the flow rate through the pipe and $r$ the hydraulic resistance. Such an electrical analogue circuit is disclosed in our Specification No. 1,068,824.

In our Specification No. 1,068,824 we disclosed an electrical function generating circuit in which the law relating the current I to the voltage E was of the form $E = k_0 f(I)$ and in which the constant $K0$ could easily be altered. The circuit was of the type including a curve-forming network of resistors and biased rectifiers arranged to provide a progressively changing number of conductive resistor-rectifier paths in response to a progressively changing input voltage and thereby to provide different effective resistances for different values of the input voltage. The first resistor of the network was always effective. To avoid changing the value of each resistor whenever a change in $k_o$ was required, a variable resistance was introduced between the input terminal of the circuit and the output terminal of a unity-gain amplifier, the input connection of which was taken through at least a part of the said first resistor of the curve-forming network to the input terminal of the circuit. The amplifier was without phase reversal and had a high input impedance. The result of this arrangement was that the current flow through the resistor between the amplifier output and the circuit input terminal was dependent on the value of this resistor and on the current flow through the curve-forming network. The value of $k_o$ could thus be altered by changing the value of this resistor without disturbing the basic law-forming network provided that the overall gain of the amplifier was held very close to unity. Since the voltage drop across the first resistor is likely to be small compared to the input voltage, the amplifier must also be capable of receiving inputs approaching the maximum value of the input voltage. In certain equipment the component arrangement required to ensure that the circuit can operate satisfactorily with input voltages much above 20V becomes increasingly complex, and may require additional protective circuitry.

According to the present invention, the circuit input voltage provides the supply voltage for an amplifier which has a high output impedance and which is such that the current flowing through a load resistor is dependent on the input voltage applied to the amplifier and is substantially independent of the supply voltage, the input of the amplifier being connected to the input terminal of the circuit across at least a part of the first resistor of the function generating circuit. The amplifier may, for example, take the form of a transistor having an emitter resistor and having its collector connected directly to the supply point. An alteration in the value of the load resistor of the amplifier alters the constant of proportionality in the relation between the current flow through the circuit and the voltage across the circuit without affecting the basic law.

With this arrangement, since the potential drop across the first resistance is much smaller than the input voltage, higher input voltages can be tolerated since only the voltage drop across the first resistor is applied to the input of the amplifier. It is also unnecessary for the gain of the amplifier to be precisely unity. To ensure correct operation down to zero input voltages, a steady supplementary voltage may be connected in series with the supply voltage to the amplifier. The supply voltage is then effectively equal to the sum of the input voltage and the supplementary voltage.

The circuit is of particular importance in the simulation by direct electrical analogue of a water or gas distribution network.

Figure 2:
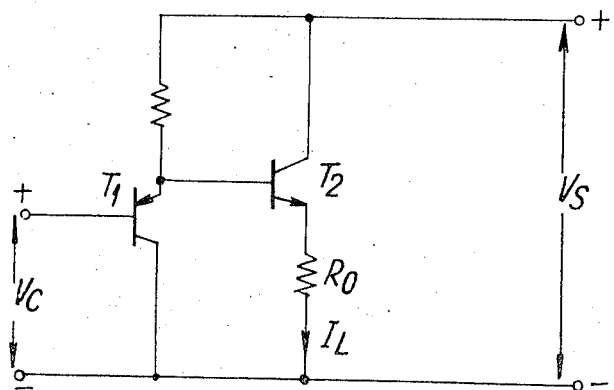

One example of the invention is shown in the accompanying drawings in which:

FIG. 1 illustrates a circuit embodying the invention; and
FIG. 2 is a circuit diagram of the amplifier in FIG. 1.

The circuit shown in FIG. 1 simulates the flow of fluid in a pipe in a direct analogue water network distribution analyser. The input to the circuit is a variable voltage E. This potential is applied to the diode-resistor network comprising, in the embodiment shown in FIG. 1, three diodes and four resistors. Such a network is known and does not form a part of this invention. One of these resistors $R_1$ is always effective. The potential across $R_1$ comprises the amplifier's supply voltage. A supplementary voltage of $10v$ is connected in series with the input voltage E to ensure correct operation of the amplifier down to $E = 0$. As shown in FIG. 1, the input terminals of the amplifier are connected across resistor $R_1$. Therefore, the supply voltage to the amplifier can never exceed the voltage drop across the resistor $R_1$. This allows the circuit to operate at relatively high input voltages while maintaining simplicity of circuitry.

Referring to the diode-resistor network of FIG. 1, the bias supply is so maintained that when the input potential E is low, all the diodes conduct, thus, the effective resistance of this network is equal to $R_1$. As the potential E increases, the first diode, shown at the extreme left of the network, becomes nonconductive. The effective resistance of the network then becomes equal to $R_1$ plus the value of the resistance located adjacent to and to the right of $R_1$, the second and third diodes remaining conductive. As the potential of E continues to increase, the other diodes become nonconductive, thus increasing the effective resistance of the network. Operation of such a network results in the slope of the curve representing the E-I characteristic of the circuit being varied each time a diode is rendered nonconductive.

Referring to FIG. 2, amplifier comprises a pair of transistors $T_1$ and $T_2$. The transistor $T_1$ which is complementary in kind to transistor $T_2$, is included to compensate for the fluctuations in the base-emitter voltage of $T_2$. The voltage input to transistor $T_2$ is therefore substantially the same as Vc and the current $I_L$ drawn by the emitter resistor $R_0$ is $\dfrac{\alpha Vc}{R_o}$ where $\alpha$ is a constant approximating to unity. The total current $I_{tot}$ drawn by the cell is given by:

$$I_{tot} = I_L + i = i\left(1 + \frac{\alpha R_1}{R_o}\right)$$

Since the network generates the law $E = K_o i^n$ or $$i = \left(\frac{E}{K_o}\right)^{1/n}$$

it follows that $$E = \frac{K_o I_{tot}{}^n}{\left(1 + \alpha \dfrac{R_1}{R_o}\right)^n}$$

The K parameter therefore has an effective value of $$\frac{K_o}{\left(1 + \alpha \dfrac{R_1}{R_o}\right)^n}$$

and is controllable by variation of $R_o$.

In practice coarse control of K may be obtained by switching in different values of the fixed resistor $R_0$ and fine control by using a potentiometer for $R_1$, the Vc positive signal being taken from its slider.

A reversal of flow in the pipe cell can be accommodated by applying the input voltage through a bridge rectifier circuit.

If desired, instead of using an n-p-n output transistor $T_2$, the transistor $T_2$ can be of smaller power and can be followed by one or more p-n-p transistors having their collectors connected to the resistor $R_o$; this has the advantage that p-n-p output transistors are at present cheaper than their n-p-n equivalents.

I claim:
1. An electrical function generating circuit comprising: a pair of input terminals for receiving an input voltage, a plurality of resistor-diode paths connected across said terminals, a first of said resistors, one terminal of which is connected to one of said input terminals, being common to all said paths, means for selectively biasing said diodes such that the conductive state of each path changes whenever an input voltage applied across said terminals exceeds the bias of the respective path, the resulting relation between said input voltage and the total current in said paths thereby following a predetermined curve, an amplifier having its input connected across at least a portion of said first resistor, the supply voltage for said amplifier comprising said input voltage taken across said first resistor, and a load resistor connected to said amplifier, the load current drawn by said amplifier being substantially independent of said input voltage and proportional to the voltage drop across said first resistor.

2. A circuit in accordance with claim 1, wherein said amplifier includes a first transistor, having a base, emitter and collector, the emitter of said transistor being connected to said load resistor, the base-emitter circuit being connected across said first resistor and the collector being connected to the other one of said input terminals.

3. A circuit in accordance with claim 1 in which said amplifier comprises a first and a second transistor, the conductivity of said first transistor being the complement of that of said second transistor, each transistor including a base, emitter and collector, the base-collector circuit of said first transistor being connected across said first resistor, the emitter of said first transistor being connected to the other one of said input terminals, the base of said second transistor being to the emitter of said first transistor, the emitter of said second transistor being connected to said load resistor and the collector of said second transistor being connected to said other one of said input terminals, whereby fluctuations in the voltage across the input of said first transistor are compensated.

4. A circuit in accordance with claim 1, including a supplementary voltage source connected in series with the amplifier voltage supply.